(12) United States Patent
Høeg (10) Patent No.: US 11,796,065 B2
(45) Date of Patent: Oct. 24, 2023

(54) PISTON ROD SEAL

(71) Applicant: Arne Høeg, Hvalstad (NO)

(72) Inventor: Arne Høeg, Hvalstad (NO)

( * ) Notice: Subject to any disclaimer, the term of this patent is extended or adjusted under 35 U.S.C. 154(b) by 536 days.

(21) Appl. No.: 16/960,832

(22) PCT Filed: Jan. 31, 2019

(86) PCT No.: PCT/NO2019/000001
§ 371 (c)(1),
(2) Date: Jul. 8, 2020

(87) PCT Pub. No.: WO2019/151868
PCT Pub. Date: Aug. 8, 2019

(65) Prior Publication Data
US 2020/0355273 A1    Nov. 12, 2020

(30) Foreign Application Priority Data

Feb. 2, 2018    (NO) .................................. 20180172

(51) Int. Cl.
*F16J 15/56*    (2006.01)
*F02G 1/053*    (2006.01)
(Continued)

(52) U.S. Cl.
CPC ............ *F16J 15/56* (2013.01); *F02G 1/0535* (2013.01); *F04B 53/144* (2013.01); *F16F 9/36* (2013.01); *F16J 15/186* (2013.01); *F16J 15/324* (2013.01)

(58) Field of Classification Search
CPC .......... F16J 15/56; F16J 15/186; F16J 15/324; F16J 9/00; F16J 9/02; F16J 9/36; F04B 53/143
See application file for complete search history.

(56) References Cited

U.S. PATENT DOCUMENTS 877,706 A * 1/1908 Duffy ................... F16J 15/3224
                                                                277/505
4,247,121 A * 1/1981 Bergman ................. F16J 15/56
                                                                277/513
(Continued)

FOREIGN PATENT DOCUMENTS

CN              201696163 U        1/2011

OTHER PUBLICATIONS

International Search Report issued in PCT/NO2019/000001, dated Apr. 26, 2019, pp. 1-2.

(Continued)

*Primary Examiner* — Eugene G Byrd
*Assistant Examiner* — L. Susmitha Koneru
(74) *Attorney, Agent, or Firm* — Jeffrey S. Melcher; Melcher Patent Law PLLC (57) ABSTRACT

A main object of the present invention is to disclose a piston rod sealing unit that solves the problems that have been mentioned from the prior art disclosures. The invention is a piston rod sealing system (0) with a sealing unit (9), for preventing leakage, of gas from a high-pressure chamber (4) to a low-pressure volume (6), and preventing leakage of a lubricant from said low-pressure volume (6) to said high-pressure chamber (4), along a piston rod (1) extending through said chambers (4, 6) said sealing unit (9) comprising, —a deformable gland (10,21,26) arranged for being pressed against said piston rod (1) by one or more compressing elements (15, 22, 27), —a lubricant (F) between the piston rod (1) and the gland (10, 21, 26), said sealing unit (9) arranged between, —a support structure (8) in the low-pressure volume (6) with a plane sliding surface (8a) facing towards said sealing unit (9), —and a wall (7) of said high-pressure chamber (4), —a plane seal (16) constituting a seal between the sealing unit (9) and said wall (7), said (Continued)

plane seal (16) arranged in a groove (13b, 24a, 26e) in said sealing unit (9), said groove open towards said wall (7), or said plane seal (16) arranged in a groove in the wall (7), said groove open towards said sealing unit (9) wherein, —said sealing unit (9) having a surface area towards said wall (7) between said piston rod (1) and said plane seal (16) smaller than the sliding area between said sealing unit (9, 12b, 25a, 28a) and the plane sliding surface (8a), and —said sealing unit (9) being supported by said plane sliding surface (8a) on the low-pressure side, and said sealing unit (9) being in sliding contact with said wall (7) surface (7a), the length (L') of said sealing unit (9) is less than the length (L) between the base structure (8) and the wall (7) allowing transverse movement of the sealing unit (9) along the sliding surfaces (7a, 8a).

17 Claims, 4 Drawing Sheets

(51) Int. Cl.
    *F04B 53/14*     (2006.01)
    *F16F 9/36*     (2006.01)
    *F16J 15/18*     (2006.01)
    *F16J 15/324*     (2016.01)

(56) References Cited

U.S. PATENT DOCUMENTS

| | | | | |
|---|---|---|---|---|
| 4,251,081 | A * | 2/1981 | Skoog | F02G 1/0535 |
| | | | | 277/540 |
| 4,431,199 | A * | 2/1984 | Iwane | F16J 15/406 |
| | | | | 277/928 |
| 4,448,424 | A * | 5/1984 | Ernst | F16J 15/56 |
| | | | | 277/411 |
| 4,832,352 | A * | 5/1989 | Sjostedt | F16J 15/56 |
| | | | | 277/910 |
| 4,936,197 | A * | 6/1990 | Brent | F16J 15/186 |
| | | | | 277/509 |
| 8,516,813 | B2 * | 8/2013 | Johansson | F16J 15/186 |
| | | | | 60/525 |
| 2004/0251635 | A1 | 12/2004 | Ishida | |
| 2010/0199658 | A1 * | 8/2010 | Johansson | F02G 1/044 |
| | | | | 60/517 |
| 2013/0099486 | A1 * | 4/2013 | Weh | F16K 15/026 |
| | | | | 285/347 |

OTHER PUBLICATIONS

Written Opinion issued in PCT/NO2019/000001, dated Apr. 26, 2019, pp. 1-4.

* cited by examiner

Fig.1

PISTON ROD SEAL

The invention relates to a piston rod sealing unit, surrounding a reciprocating piston rod, which is passed through an opening in a wall separating a high-pressure gas volume and a low-pressure volume. The piston rod sealing unit is designed to prevent gas leakage from the high-pressure gas volume at one side of the sealing unit, to the low-pressure volume at the other side of said unit, while at the same time preventing lubricant leakage from the low-pressure volume to the high-pressure volume.

PRIOR ART

A piston rod seal of this type has been enclosed in U.S. Pat. No. 4,251,081. This patent describes a piston rod seal comprising a plastically deformable gland adapted to surround a reciprocating piston rod. In said known device, the gland is axially compressed through conical elements, providing a radial, inwardly directed force on the gland towards the piston rod. However, the piston rod—leakage along which should be prevented—is normally guided at its two ends, one of which is carrying the piston whereas the other is carrying a crosshead. The structure providing this guiding will unavoidably allow small transverse movements of the piston rod relative to the axis of the opening in the wall through which the rod is passed. This will be due to the radial clearances between the piston and crosshead and their guiding surfaces, as well as to harmonic oscillations in the piston rod itself. Any transverse movement of the conical surfaces through which the axial force on the gland is transmitted will cause unwanted gas leakage.

Another piston rod seal of this type has been enclosed in U.S. Pat. No. 4,832,352. This patent describes a piston rod seal that allows small radial movements of the piston rod and sealing surface relative to opening in the wall of the high-pressure volume. However, the sealing solution depends on elastic and plastic deformation of the gland, which limits the magnitude of the allowed radial movements. In a reciprocating machine, the typical diametral gap between the crosshead and guiding surface is 0.2% of the radius, and the typical piston of such machines that benefit from a seal that prevents lubricant from entering the cylinder, is guided by bearings made from polymer composites, that have wear allowances in the region of 0.2 to 1% of the radius. When the piston rod is compressed, some level of bending is introduced, which may even lead to harmonic oscillation in the piston rod. The radial movements of the piston rod may then exceed 0.5% of the cylinder diameter, and as the typical piston rod diameter may be ⅕ of the cylinder diameter, the radial movement of the piston rod may be in the region of 2-3% of the piston rod diameter. Radial deformation of this magnitude will lead to high stress levels and stress amplitudes in the gland, that will reduce the life of the gland described in the prior art, and the stress levels will also lead to uneven force on the gland that may reduce the sealing performance of the piston rod seal.

Another piston rod seal of this type has been proposed in the report 'Automotive Stirling Engine Mod II Design Report' by Noel P. Nightingale. The report describes a piston rod seal of the same type as in U.S. Pat. No. 4,251,081, where the sealing gland is fitted between two conical elements. On the high-pressure side of the gland, the conical element is pressed against the gland by a spring, and is otherwise free to move in all directions. On the low-pressure side of the gland, the conical element is supported by a plane sliding surface, to allow the element to be displaced by the piston rod's movements. An O-ring is provided to seal between the conical element and the sliding surface. However, the sealing solution depends on small movements between the conical element on the low-pressure side of the gland and the plane sliding surface. The contact surface between the two parts, is exposed to both the gas pressure, acting on the area between the O-ring and the piston rod surface, and the force from the spring, acting on the assembly of gland and conical elements. The O-ring also reduces the effective load-supporting area. The total load on the sliding surface is significant, and even with small movements of the piston rod and seal unit, the friction will lead to uneven loading of the seal gland, which may reduce the sealing performance. The contact pressure between the conical element and the sliding surface, will lead to wear in contact surface, and the wear may occur in both parts, leading to grooves in the sliding surface, that may prevent radial movement of the conical element. When the radial movement of the conical element is prevented, the movements of the piston rod, may lead to uneven loading of the gland, and movement between the conical surfaces of the gland and the conical element, which in turn will lead to unwanted gas leakage. In addition, the wear particles may contaminate the process fluid and the lubricant between the gland and the piston rod. This type of seal is also described in CN 201696163U.

Another piston rod seal assembly is depicted in U.S. Pat. No. 8,516,813. This patent describes a piston rod seal assembly, in which the sealing gland is supported by a conical element that is allowed to slide against a polished plane surface, on a washer made from PI (Polyimide). This solution is an improvement upon the seal proposed in the report 'Automotive Stirling Engine Mod II Design Report', in that a material combination with dry slide bearing properties is used. The sealing solution also uses two axial springs. However, the washer must transfer both the force from the pressure acting on the area between the O-ring and the piston rod, and the force from the springs, and this will lead to friction, that will lead to uneven loading of the seal gland, which may reduce the sealing performance.

The prior art solutions all comprise a plastically deformable gland with a cylindrical surface that is pressed against a piston rod by a radial force. A lubricant film is drawn between the adjacent surfaces of the piston rod and the sealing gland, and forms a liquid barrier against gas leakage along the piston rod. The glands of the prior art solutions are shown with a conical surface extending from the cylindrical surface of the gland on the high-pressure gas side of the gland, located outside of the part of the gland exposed to radial forces. The function of which is to accumulate any oil passing between the gland and the piston rod in the direction towards the high-pressure gas between the conical surface and the piston rod. The wedge-shape created between the conical surface and the piston rod causes a pumping effect during the oscillating piston rod motion that reverses the oil flow until a balance between oil flow in the two directions is obtained.

All of the prior art solutions show a second sealing element on the high-pressure side of the main sealing element. The purpose of which is to maintain a uniform gas pressure between the main and the second sealing elements, while the gas pressure in the cylinder may vary due to the process in the cylinder. Another purpose of the second sealing element may be to maintain a nearly constant and possibly different temperature between the sealing elements, from the cylinder temperature. The second sealing element may be omitted, according to U.S. Pat. No. 4,251,081.

The object of the invention is to provide a piston rod seal allowing radial movement of the piston rod relative to the opening in the wall through which the the piston rod moves, while maintaining the sealing function.

Another object of the invention is to provide a piston rod seal which experience less wear in doing so, than prior art solutions, and maintains the sealing function for a longer time, than prior art solutions.

Another object of the invention is to provide a piston rod seal with less friction than prior art solutions, due to improved sliding surfaces and lower loads.

A still further object of the invention is to provide an alternative solution to prior art solutions.

Short Summary of the Invention

A main object of the present invention is to disclose a piston rod sealing unit that solves the problems that have been mentioned from the prior art disclosures. The invention is a piston rod sealing system (0) with a sealing unit (9), for preventing leakage, of gas from a high-pressure chamber (4) to a low-pressure volume (6), and preventing leakage of a lubricant from said low-pressure volume (6) to said high-pressure chamber (4), along a piston rod (1) extending through said chambers (4, 6)
said sealing unit (9) comprising,
a deformable gland (10,21,26) arranged for being pressed against said piston rod (1) by one or more compressing elements (15, 22, 27)
a lubricant (F) between the piston rod (1) and the gland (10, 21, 26),
said sealing unit (9) arranged between,
a support structure (8) in the low-pressure volume (6) with a plane sliding surface (8a) facing towards said sealing unit (9),
and a wall (7) of said high-pressure chamber (4),
a plane seal (16) constituting a seal between the sealing unit (9) and said wall (7), said plane seal (16) arranged in a groove (13b, 24a, 26e) in said sealing unit (9), said groove open towards said wall (7), or said plane seal (16) arranged in a groove in the wall (7), said groove open towards said sealing unit (9)
wherein,
said sealing unit (9) having a surface area towards said wall (7) between said piston rod (1) and said plane seal (16) smaller than the sliding area between said sealing unit (9, 12b, 25a, 28a) and the plane sliding surface (8a), and
said sealing unit (9) being supported by said plane sliding surface (8a) on the low-pressure side, and said sealing unit (9) being in sliding contact with said wall (7) surface (7a), the length (L') of said sealing unit (9) is less than the length (L) between the base structure (8) and the wall (7) allowing transverse movement of the sealing unit (9) along the sliding surfaces (7a, 8a).

Further the invention is a method of sealing a piston rod (1) for preventing leakage of gas from a high-pressure chamber (4) with a wall (7) to a low-pressure volume (6) with a support structure (8) having a sliding surface (8a), and preventing leakage of a lubricant from said low-pressure volume (6) to said high-pressure chamber (4), along said piston rod (1) extending through said chambers (4, 6), comprises a sealing unit (9) with a housing (11, 23, 28) arranged between said two chambers (4, 6) and placed concentrically to said piston rod (1), where the method comprises the following:

a plane seal (16) constitutes a seal between said sealing unit (9) and said wall (7),
a deformable gland (10, 21, 26) is arranged for being pressed against said piston rod (1) by one or more compressing elements (15, 22, 27),
lubricant (F) is injected between the piston rod (1) and the gland (10, 21, 26),
said plane seal (16) defining a surface area towards said wall (7) between said piston rod (1) and said plane seal (16) is smaller than a surface defined by the adjacent surfaces of said sealing unit (9, 12b, 25a, 26c, 28a) and said sliding surface (8a), and
said sealing unit (9) being supported by said plane sliding surface (8a) on the low-pressure side, and said plane seal (16) is in sliding contact with said wall (7) surface (7a), the length (L') of said sealing unit (9) is less than the length (L) between the base structure (8) and the wall (7) allowing a transverse movement of the sealing unit (9) along the sliding surfaces (7a, 8a).

DETAILED DESCRIPTION OF THE FIGURES AND EMBODIMENTS OF THE INVENTION

The invention will in the following be described and embodiments of the invention will be explained with reference to the accompanying drawings.

Figure 1:
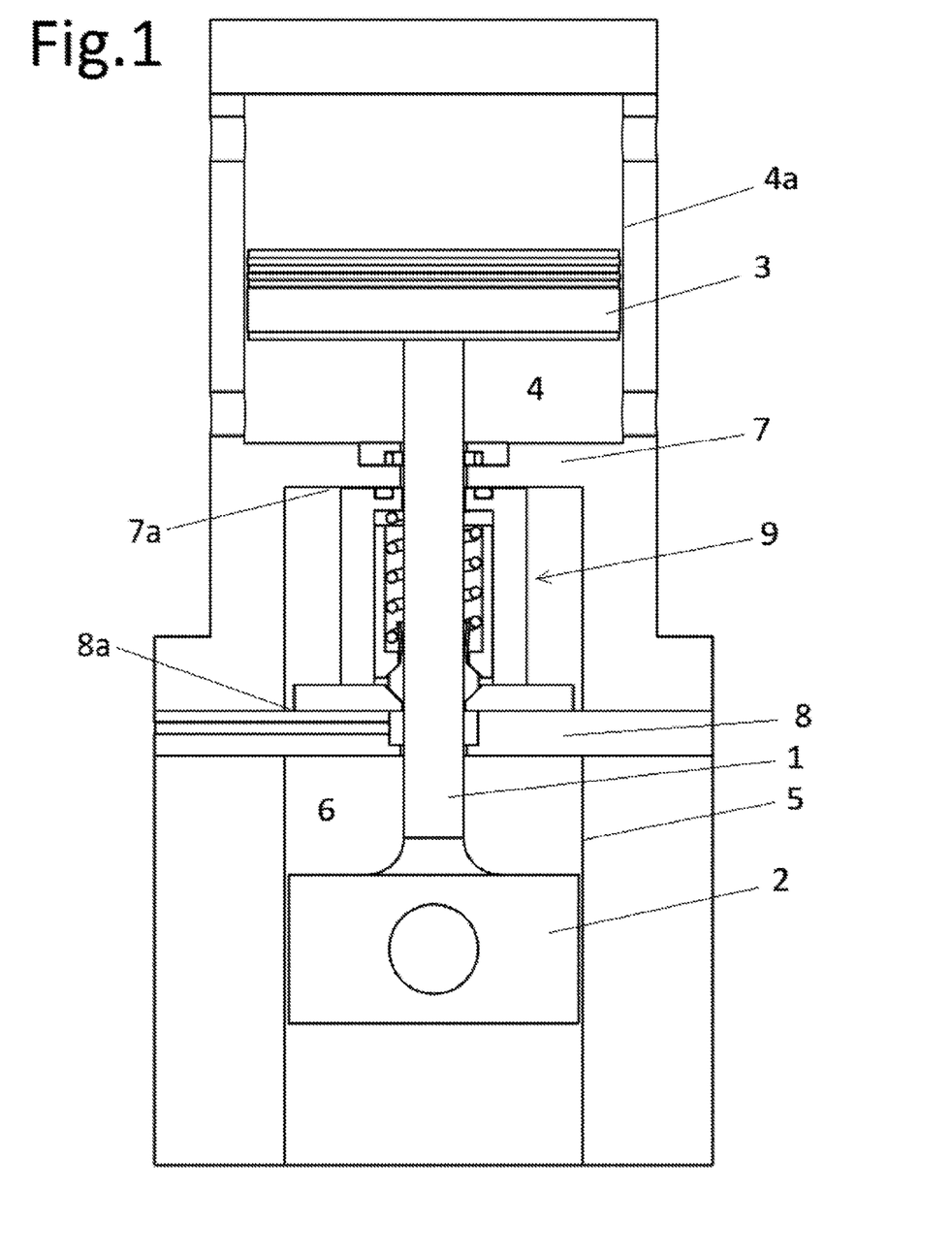
FIG. 1 is a cross-sectional view of a reciprocating piston machine cylinder of typical lay-out, showing the position of the piston rod sealing unit.

FIG. 1 shows a piston rod (1), connected to a crosshead (2) and a piston (3). The piston (3) is placed in a high-pressure chamber (4), which may be a cylinder, and guided by a wall (4a) of the high-pressure chamber (4). Another wall (7) of the high-pressure chamber is shown as an integral part of the wall (4a). In another embodiment of the invention, the wall (7) may be a separate part, bolted or fixed to the wall (4a). The crosshead (2) is guided by a guiding surface (5) in a low-pressure, lubricated volume (6). The guiding surface (5) may be part of a crankcase or other fixed structure. In another embodiment of the invention, said guiding surface may be a surface of the same part as the wall (7). A support structure (8) is shown between the wall (7) and the guiding surface (5). Said support structure may be a distinct part, fixed to either a crankcase, the wall (7), the guiding surface (5) or both, or it may be integrated into any of these parts. The piston rod (1) moves through (in an oscillating way) an opening in the wall (7) of the high-pressure chamber, and an opening in the support structure (8) in the low-pressure volume. A sealing unit (9) is placed around the piston rod (1), between a plane surface (7a) of the high-pressure chamber wall (7) and a plane surface (8a) of the support structure (8). A volume (6a) between the chamber wall and the support structure, may be connected to the low-pressure volume (6). In another embodiment of the invention, the volume (6a) may be a separate volume.

Figure 2:
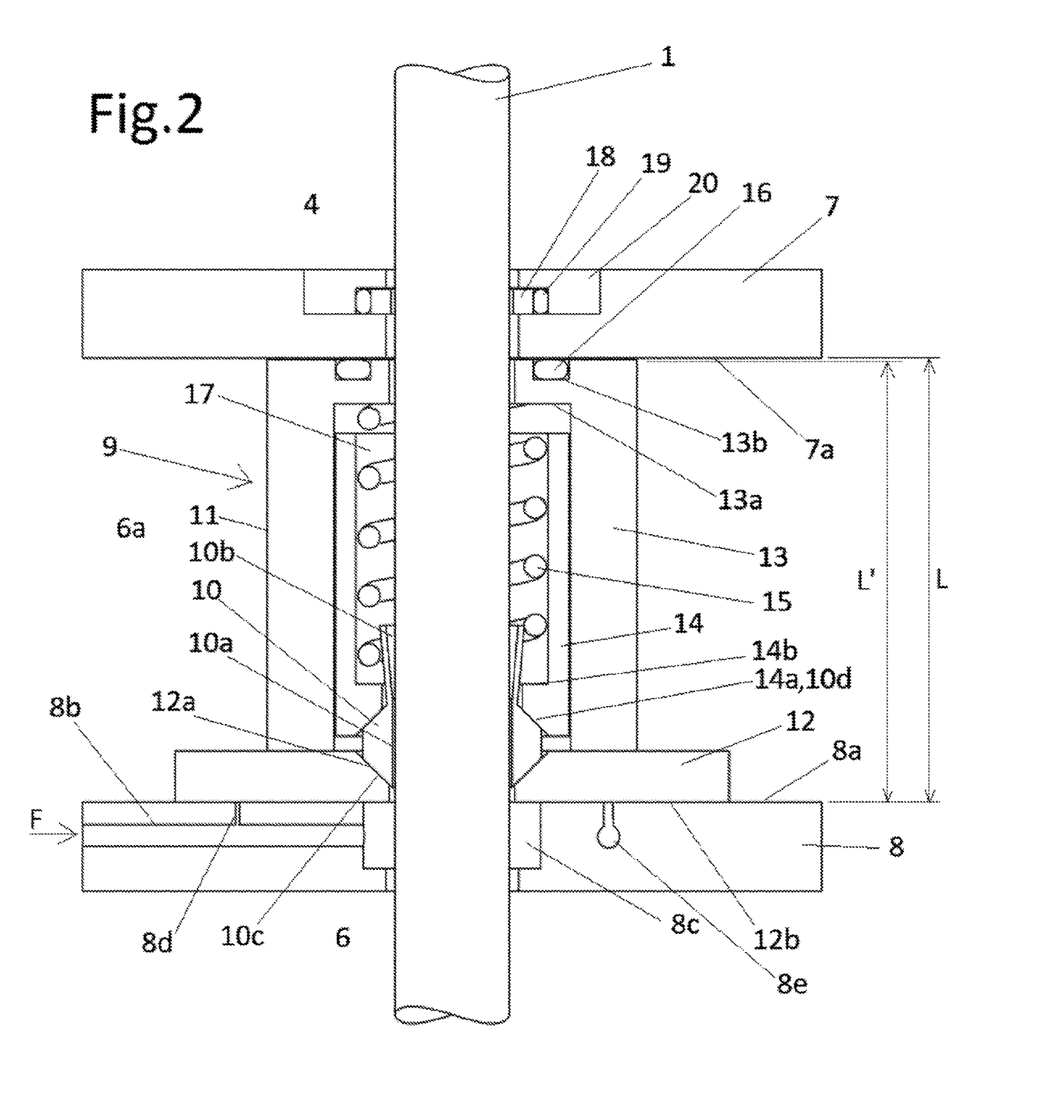
FIG. 2 is a cross-sectional view through a piston rod sealing unit according to an embodiment of the invention.

FIG. 2 shows the piston rod (1) and the sealing unit (9) of FIG. 1 in more detail. The sealing unit is placed around the piston rod (1), between a plane surface (7a) of a high-pressure chamber wall (7) and a plane surface (8a) of a support structure (8). The distance between the surface (7a) and the surface (8a), (L) is larger than the axial length (L") of the sealing unit (9), so that said sealing unit is free to move both in the transverse direction relative to the piston rod movement, but also to a small degree in the axial direction. The small movement in the axial direction is sufficient to allow the formation of a lubricant film between the sealing unit (9) and the plane surface (8a), and to allow the possibility of different thermal expansion of the components during operation. The difference between (L) and (L") may be in the region of 0.1 to 0.2 mm.

A sealing gland (10), is placed in a sealing housing (11), which may consist of a lower part (12) and an upper part (13). The gland is fitted between a conical surface (12a) of the lower housing part, and a conical surface (14a) of a spring guide (14). The gland (10) may be arranged with two conical surfaces (10c, 10d). The spring guide (14) is pressed against the gland (10) by a pre-loaded spring (15), said spring (15) fitted concentrically with the spring guide (14) and between an inner wall (13a) of the upper housing part and the lower part (12). The force from the spring (15) is transferred to the gland (10) through the conical surfaces (12a, 14a) between the gland (10) and the lower housing part (12) and the spring guide (14), pressing a cylindrical surface (10a) of the gland (10) against the piston rod (1). The force from the spring (15) also presses the gland (10) against the conical surface of the lower housing part (12), creating a sealing surface. A distinct housing (11) makes it possible to manufacture the sealing unit (9) to a precise length (L"), and also makes it possible to prevent the axial force from the spring (15) from creating friction between the sealing unit (9) and the wall (7) and support structure (8).

An O-ring (16) is placed in a groove (13b) of the housing (11), against the plane surface of the chamber wall (7). Leakage of gas from an internal volume (17) of the seal unit, to the low-pressure volumes (6) and (6a) is thus prevented. Lubricant is supplied through a duct (8b) in the supporting structure, to a space (8c) between the supporting structure, the piston rod (1) and the seal housing (11). The purpose of said lubricant supply is to maintain a lubricant film between the piston rod (1) and the gland (10), to act as a barrier against leakage of gas from the high-pressure chamber (4). The separate duct (8b) may be omitted if lubricant in sufficient quantities is provided on the surface of the piston rod (1) by other means, e.g. splashing internally within a crankcase by connecting rods or similar. As the piston rod moves through the gland (10) in the direction from the low-pressure volume (6) to the high-pressure volume (4), lubricant is drawn into the narrow gap between the piston rod and the cylindrical surface of the gland (10a), so that said lubricant film is formed. When the gland (10) is pressed against the piston rod (1), said gap is made narrower, and the lubricant film is less affected by the pressure gradient between the high-pressure volume (4) and the low-pressure volume (6), than by the velocities of the surfaces and the viscosity of the lubricant. If the gland (10) is made from a plastically deformable compound such as PTFE (polytetrafluorethylene), the shape of the cylindrical surface (10a) will adapt to the diameter of the piston rod (1), and the lubricant film, in such a way that there will be a balance between the film pressure and the radial forces pressing the gland (10) against the piston rod (1).

The sealing unit (9) has a sliding surface (12b) on the low-pressure side (6) of the unit, and said unit is allowed to move transversely in an unobstructed manner, along the support structure (8). The sliding surface may be lubricated by lubricant from the space (8c), from a side duct (8d) from the lubricant duct (8b), from a separate lubricant duct (8e) or from other internal or external sources. The lubricant may be supplied at a pressure larger than the ambient pressure in the volumes (6) and (6a), in which case the friction arising from transverse movement of the sealing unit, will be reduced to close to zero.

The seal housing (11) has two openings: One is sealed by the gland (10), and the other is sealed by the O-ring (16). The two seals separate the internal volume (17) from the surrounding volumes (6) and (6a). The seals have different sealing diameters, the sealing diameter of the gland (10) is the same as the piston rod diameter, and the sealing diameter of the O-ring (16) is approximately in the centre of the groove (13b), which is always larger than the piston rod diameter. The gas pressure of the internal volume (17) acts on all the internal surfaces, as well as on the outside area of the housing (11) between the piston rod and the centre of the groove (13b). Pressure acting on an area results in a pressure force, and the sum of all the pressure forces on the seal housing, is a net pressure force, pressing the seal housing against the sliding surface (8a), equal to the product of the pressure difference between the internal volume (17) and the external volumes (6) and (6a), multiplied by the difference between the areas within the sealing diameters of the gland (10) and the O-ring (16). This difference between the two areas is referred to as the effective pressurised area of the seal unit. If the groove (13a) is positioned relatively close to the piston rod (1), the difference between the pressurised areas is relatively small, and the resulting pressure force pressing the seal housing (11) against the sliding surface (8a) will be small, even if the pressure difference between the internal volume (17) and the external volumes (6) and (6a) is large.

The sliding surface (12b) can be made much larger than the effective pressurised area of the seal unit. The net pressure force on the sealing unit will be distributed across the whole sliding surface (12b), and the resulting load on said sliding surface will be equal to the pressure difference between the internal volume (17) and the pressure of the external volumes (6) and (6a) times the ratio of the effective pressurised area of the seal unit divided by the area of the sliding surface (12b). This ratio can be made so small that the load on the sliding surface will become so low that many types of sliding surfaces may be used. Either the sliding surface (12b) or the plane surface (8a) may be made from a typical bearing alloy, e.g. bronze.

The gland (10) is illustrated with a conical surface (10b) extending from the cylindrical surface on the high-pressure side of the gland. The function of this conical surface is described in the prior art. In another embodiment of the invention, this surface may perform the same pumping function with a number of other shapes described in the literature of hydrodynamics and hydrodynamic bearings in particular, e.g. a stepped shape with a diameter larger than the piston diameter above the cylindrical surface (10a). For the purpose of simplicity, all figures show glands with a conical surface extension.

In one embodiment a second optional sealing element (18) may be placed in the chamber wall (7) above the seal unit. The chamber wall (7) will have a recess or groove that caters for a correct and stable surface that provides a functional fit for the sealing element. This second sealing element (18) is arranged on the high-pressure side of the main sealing element (10, 21, 26), where the second sealing element (18) is arranged in the wall (7), the second sealing element being coaxially located with the piston rod (1). The second sealing element (18) may be enclosed by a distinct cover (20), but the cover (20) may be part of the wall (7). The second sealing element (18) is pressed against the piston rod (1) by an O-ring (19) that can be placed between the cover (20) and the wall (7) wherein the O-ring (19) is arranged coaxially and radially on the outer perimeter of the second sealing element (18). This in turn will lead to that the O-ring (19) exerts a radial force that presses the second sealing element (18) against the piston rod (1). Other means of obtaining the radial force, e.g. a radial spring, may be used instead of the O-ring (19). The function of the second seal element (18) is to maintain an almost constant gas pressure in the internal volume, by reducing the leakage between the high-pressure chamber (4), where the pressure may vary significantly during each piston rod stroke, and the internal volume (17) of the sealing unit.

Figure 3:
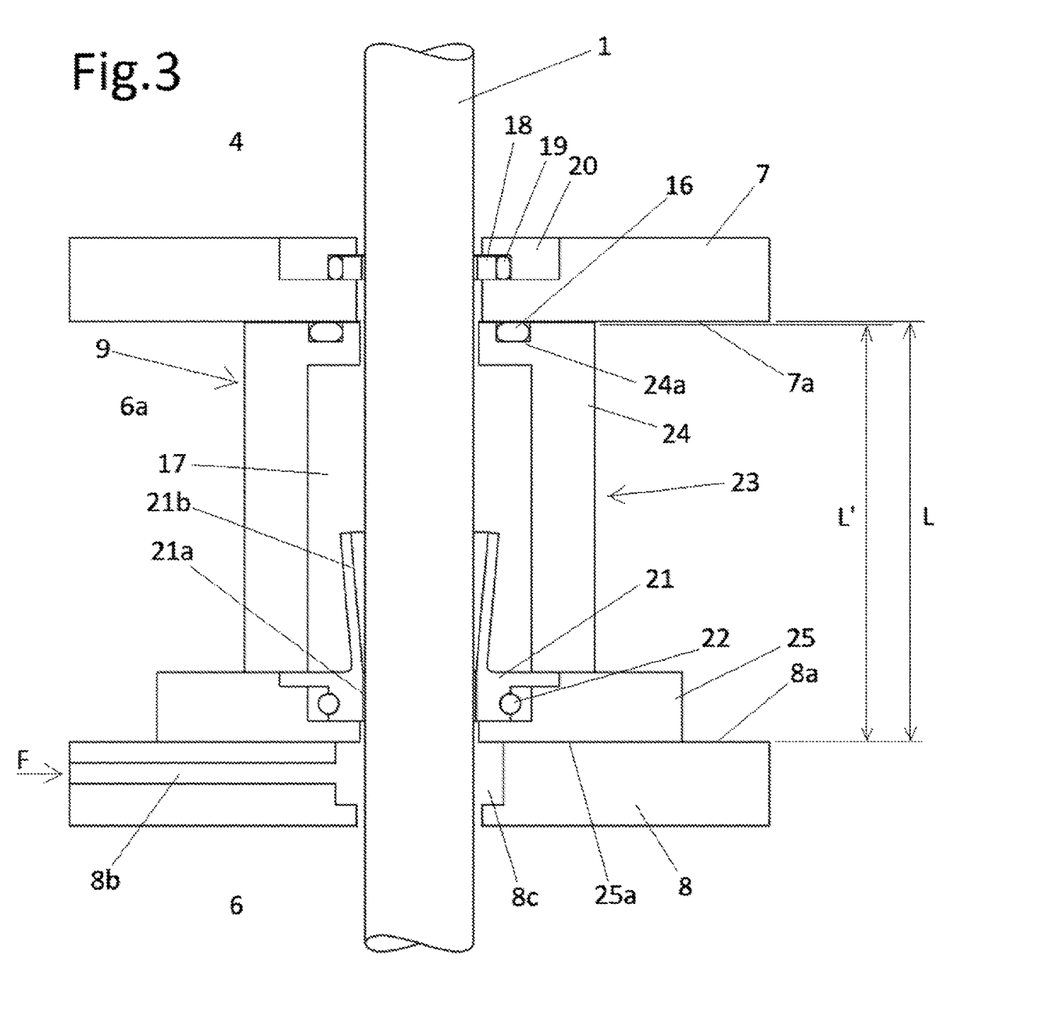
FIG. 3 is a cross-sectional view through a piston rod sealing unit according to another embodiment of the invention.

FIG. 3 shows a different embodiment of the invention, in which the radial force on the gland is provided by a ring-shaped spring, similar to the spring of prior art solution U.S. Pat. No. 4,832,352. The sealing unit of FIG. 3 has many similarities with the sealing unit of FIG. 2, and similar items will only be described if necessary for understanding FIG. 3.

The sealing unit (9) according to the invention is placed around a piston rod (1), between a plane surface (7a) of a chamber wall (7), and a plane surface (8a) of a support structure (8). The chamber wall (7) separates a high-pressure chamber (4) from a low-pressure volume (6). The sealing unit is surrounded by a volume (6a), that may be connected to the volume (6). The distance (L) between the surface (7a) and the surface (8a) is larger than the axial length of the sealing unit (L").

A sealing gland (21), is placed in a sealing housing (23), which may consist of a lower part (25) and an upper part (24). The gland is fitted in the housing in such a way that its perimeter is held in place, and that leakage between its perimeter and the housing is prevented. A cylindrical surface (21a) of the gland is pressed against the piston rod by a ring-shaped spring element (22), creating a radial force on the gland. The distance between the surfaces (7a) and (8a) is larger than the housing (23) of the sealing unit, to allow for thermal expansion and formation of a lubricant film between the housing (23) and the surface (8a).

An O-ring (16) is placed in a groove (24a) of the housing, against the plane surface (7a) of the chamber wall. Leakage of gas from an internal volume (17) of the seal unit, to the low-pressure volumes (6) and (6a) is thus prevented.

The sealing unit has a sliding surface (25a) on the low-pressure side of the unit, and it is allowed to move transversely along the support structure. The sliding surface may be lubricated by lubricant from the space (8c) or from other sources.

Figure 4:
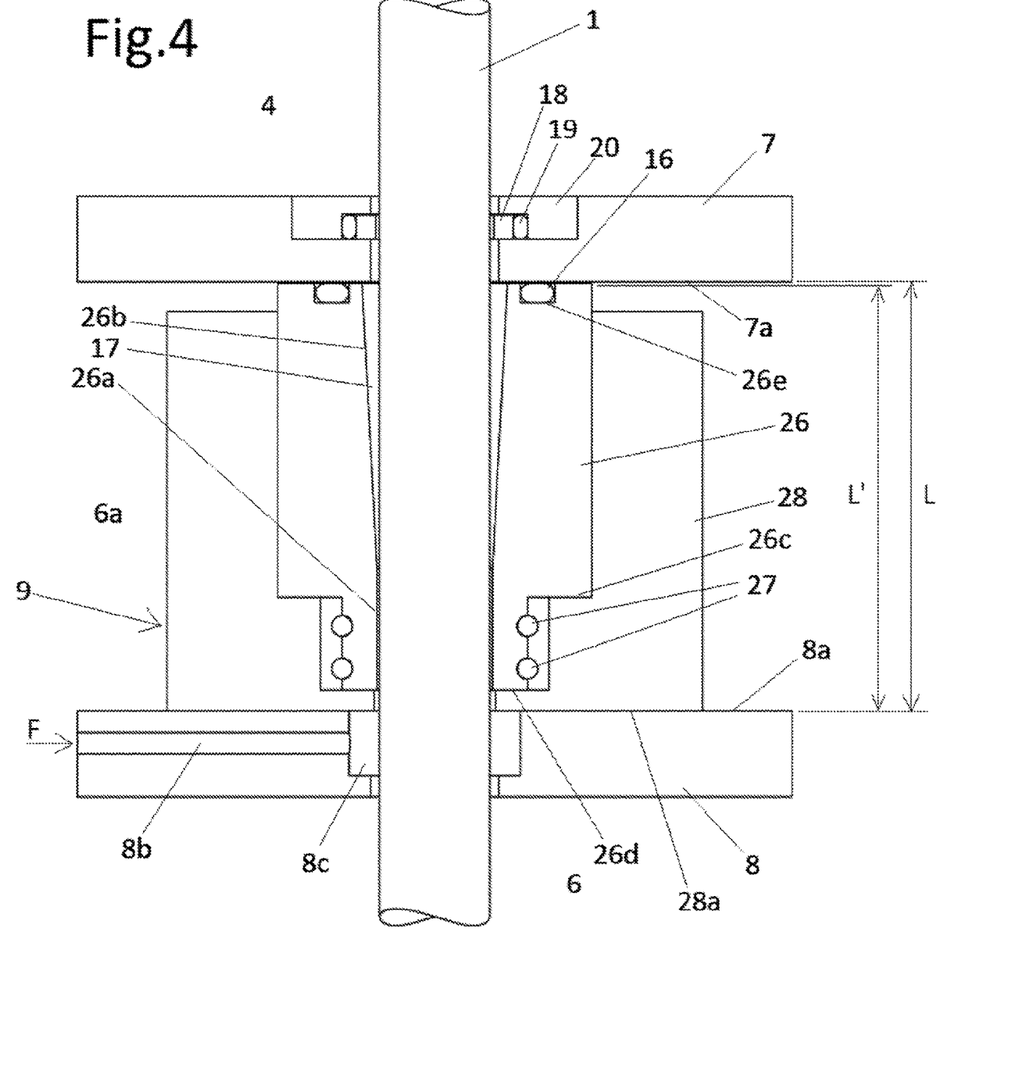
FIG. 4 is a cross-sectional view through a piston rod sealing unit according to another embodiment of the invention.

FIG. 4 shows a still different embodiment of the invention, in which the piston rod sealing unit is designed with fewer parts. The sealing unit of FIG. 4 has many similarities with the sealing unit of FIGS. 2 and 3, and similar items will only be described if necessary for understanding FIG. 4.

The sealing unit according to the invention is placed around a piston rod (1), between a plane surface (7a) of a chamber wall (7), and a plane surface (8a) of a support structure (8). The distance (L) between the surface (7a) and the surface (8a) is larger than the axial length of the sealing unit (L").

The chamber wall (7) separates a high-pressure chamber (4) from a low-pressure volume (6). The sealing unit is surrounded by a volume (6a), that may be connected to the volume (6).

A plastically deformable gland (26) with a cylindrical surface (26a) is pressed against a piston rod (1) by a number of springs (27) that provide radial force. The gland has a conical surface (26b) extending from the cylindrical surface on the high-pressure side of the gland, outside of the part of the gland exposed to radial force. The gland is placed in an optional housing (28) supported by the plane surface of the supporting structure. The gland is supported in the axial direction by a plane surface (26c) resting on an adjacent surface of the housing, and the gas pressure acting on the gland will result in an axial force pressing the gland against the housing. Another plane surface (26d) of the gland may rest on another adjacent surface of the housing.

An O-ring (16) is placed in a groove (26e) of the gland, against the plane surface of the chamber wall. Leakage of gas from an internal volume (17) of the seal unit, to the low-pressure volumes (6) and (6a) is thus prevented.

A sliding surface (28a) of the housing on the low-pressure side of the sealing unit, allows the sealing unit to move transversely along the support structure.

The sliding surface may be lubricated by lubricant from the space (8c) or from other sources. In another embodiment of the invention, the gland (26) and the housing (28) may be integrated into one part, and the surface (26c) could be extended and slide against the surface (8a). This may result in a sealing solution with fewer parts than, and possibly lower production cost, than the embodiment shown in FIG. 4.

Lubricant is supplied through a duct (8b) in the supporting structure, to a space (8c) between the supporting structure, the piston rod and the seal housing.

In one embodiment of the invention, the piston rod sealing unit is used for prevention of leakage of gas from a cylinder, along a piston rod in a reciprocating piston machine, and for prevention of lubricant leakage into the cylinder, along said piston rod. The sealing unit according to the invention, may be used in compressors and expanders, and in several types of engines, heat pumps and cooling machines. The sealing unit may be used in stirling engines or stirling cycle heat pumps or in other types of hot-air machines.

The invention claimed is:

1. A piston rod sealing system with a sealing unit, for preventing leakage, of gas from a high-pressure volume to a low-pressure volume, and preventing leakage of a lubricant from said low-pressure volume to said high-pressure volume, along a piston rod extending through said volumes said sealing unit comprising, a deformable gland arranged for being pressed against said piston rod by one or more compressing elements, a lubricant between the piston rod and the gland, said sealing unit arranged between, a support structure in the low-pressure volume with a plane sliding surface facing towards said sealing unit, and a wall of said high-pressure volume, a plane seal constituting a seal between the sealing unit and said wall, said plane seal arranged in a groove in said sealing unit, said groove open towards said wall, or said plane seal arranged in a groove in the wall, said groove open towards said sealing unit, wherein, said sealing unit having a surface area towards said wall between said piston rod and said plane seal smaller than the sliding area between said sealing unit and the plane sliding surface, and said sealing unit being supported by said plane sliding surface on the low-pressure side, and said sealing unit being in sliding contact with said wall surface, the length of said sealing unit is less than the length between the base structure and the wall allowing transverse movement of the sealing unit along the sliding surfaces.

2. A piston rod sealing unit according to claim 1, wherein said plane sliding surface is lubricated through channels arranged in said supporting structure, to a space between said supporting structure, piston rod and sealing unit, or through side ducts from the channel or through a separate channel.

3. A piston rod sealing unit according to claim 1, wherein said gland is situated in a sealing housing unit, and where said sealing housing unit comprises a plane sliding surface facing towards said support structure and said sealing housing unit comprises said plane seal.

4. A piston rod sealing unit according to claim 1, wherein said gland is made with at least one external conical surface and where said gland is pressed against a conical surface of said sealing housing unit by an axial spring, said axial spring coaxially arranged within said housing unit to create a radial force on said gland pressing said gland against said piston rod.

5. A piston rod sealing unit according to claim 1, further comprising one or more circular springs arranged radially on the outer perimeter of said gland, where said circular springs exert a radial force on said gland, said gland being pressed against said piston rod.

6. A piston rod sealing unit according to claim 1, wherein said plane seal is part of the gland.

7. A piston rod sealing unit according to claim 1, wherein the gland is made from a PTFE (polytetrafluorethylene) compound.

8. A piston rod sealing unit according to claim 1, further comprising a second sealing element arranged on the high-pressure side of the main sealing element, said second sealing element arranged in said wall of said high-pressure volume, said second sealing element arranged coaxially with said piston rod, and said sealing element being made from a PTFE (polytetrafluorethylene) compound.

9. A piston rod sealing unit according to claim 8, wherein said second sealing element being pressed against said piston rod by an O-ring arranged coaxially and radially on the outer perimeter of said second sealing element.

10. A method of sealing a piston rod for preventing leakage of gas from a high-pressure volume with a wall to a low-pressure volume with a support structure having a sliding surface, and preventing leakage of a lubricant from said low-pressure volume to said high-pressure volume, along said piston rod extending through said volumes, comprises a sealing unit with a housing arranged between said two volumes and is placed concentrically to said piston rod, where the method comprises the following:

a plane seal constitutes a seal between said sealing unit and said wall, a deformable gland is arranged for being pressed against said piston rod by one or more compressing elements, lubricant is injected between the piston rod and the gland, said plane seal defining a surface area towards said wall between said piston rod and said plane seal is smaller than a surface defined by the adjacent surfaces of said sealing unit and said sliding surface, and said sealing unit being supported by said plane sliding surface on the low-pressure side, and said plane seal is in sliding contact with said wall surface, the length of said sealing unit is less than the length between the base structure and the wall allowing a transverse movement of the sealing unit along the sliding surfaces.

11. A method of sealing a piston rod for preventing leakage, of gas from a high-pressure volume to a low-pressure volume, and preventing leakage of a lubricant from said low-pressure volume to said high-pressure volume, along a piston rod extending through said volumes piston rod sealing unit according to claim 10, wherein said method is used in a Stirling engine, a heat pump operating on a Stirling cycle, a hot-air machine or a reciprocating compressor.

12. The piston rod sealing member according to claim 1, wherein the gland has a cylindrical surface and the one or more compressing elements comprises a ring-shaped spring.

13. The piston rod sealing member according to claim 1, wherein the gland has a cylindrical surface and the one or more compressing elements comprises a plurality of ring-shaped springs.

14. The piston rod sealing member according to claim 1, wherein said gland is situated in a sealing housing unit and an O-ring is in a groove of the housing.

15. The piston rod sealing member according to claim 4, wherein an O-ring is in a groove of the housing.

16. The piston rod sealing member according to claim 13, wherein an O-ring is in a groove of the gland.

17. The piston rod sealing member according to claim 4, wherein the housing has a conical shape.

\* \* \* \* \*